Feb. 14, 1928.
R. A. MUNCH
1,658,935
METALLIC PACKING RING
Filed May 21, 1921   3 Sheets-Sheet 1
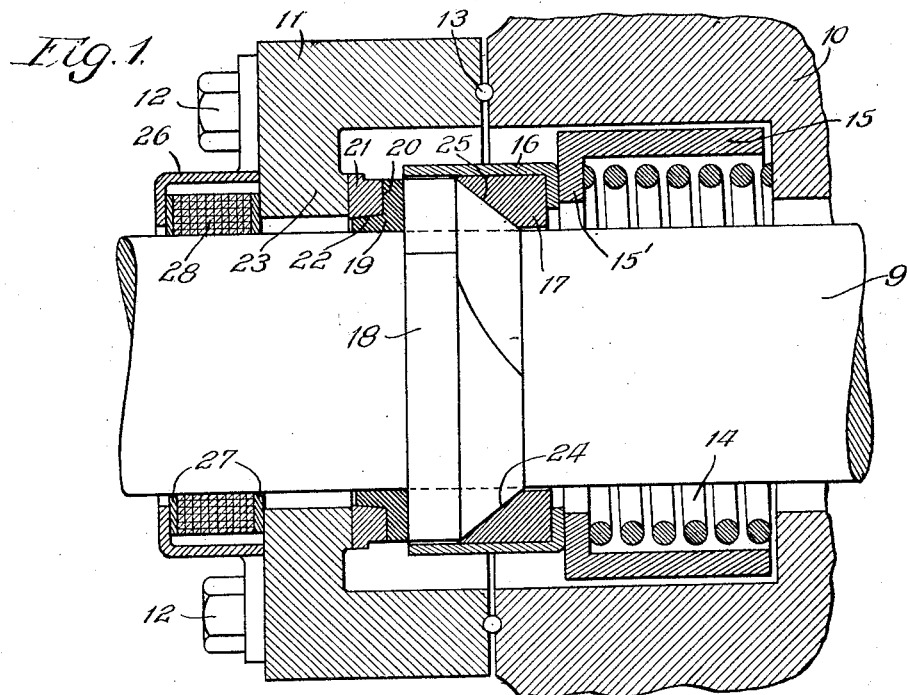
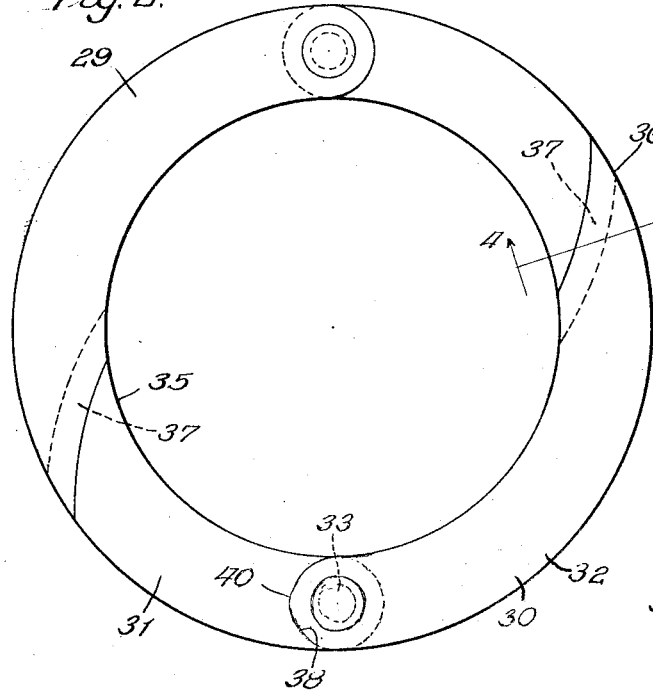
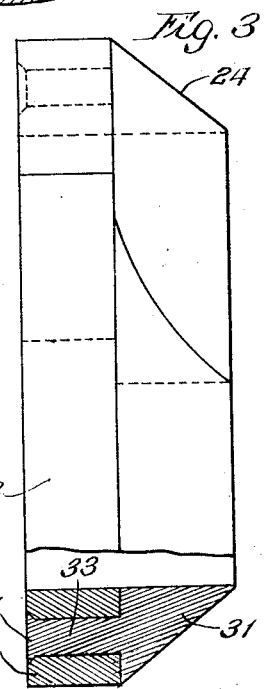
Inventor
Robert A. Munch
By Fisher, Towle, Clapp & Soans Attys.

Feb. 14, 1928.
R. A. MUNCH
METALLIC PACKING RING
Filed May 21, 1921     3 Sheets-Sheet 2
1,658,935
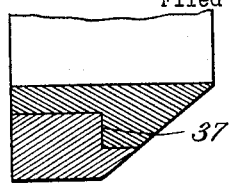
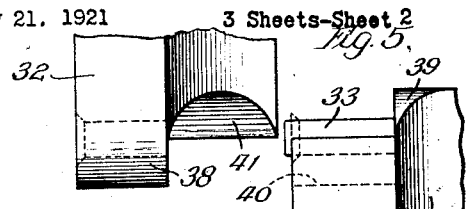
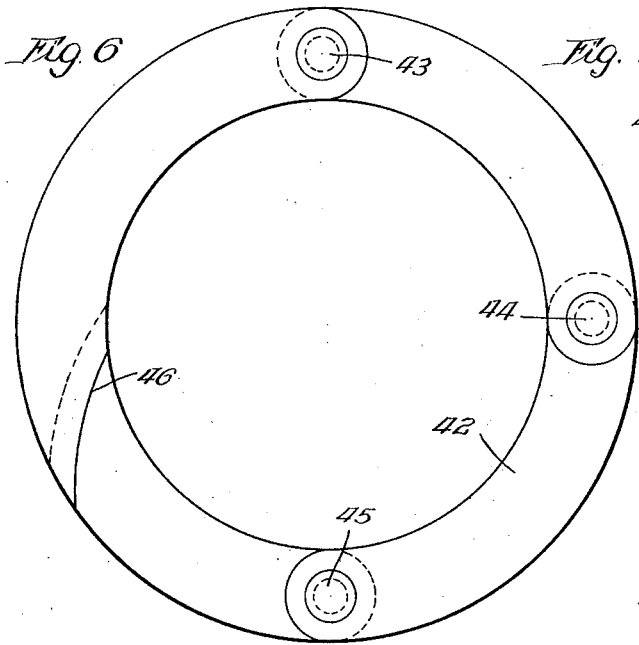
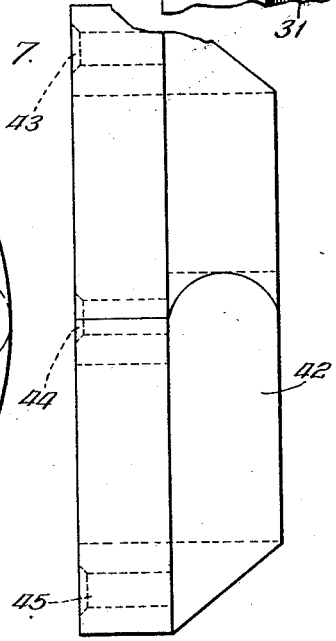
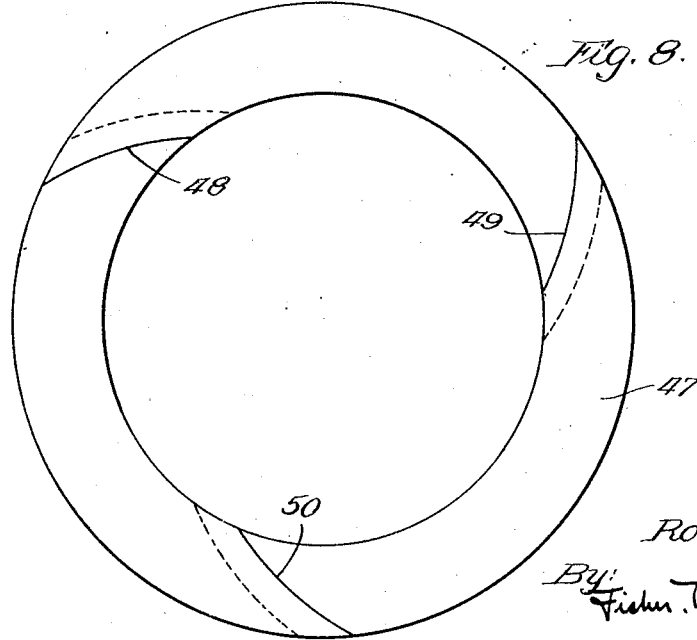
Inventor:
Robert A. Munch.
By Fisher, Towle, Clapp & Soans
Attys.

Feb. 14, 1928. 1,658,935
R. A. MUNCH
METALLIC PACKING RING
Filed May 21, 1921  3 Sheets-Sheet 3

Inventor:
Robert A. Munch.
By Fisher, Towle, Clapp & Soans
Attys.

Patented Feb. 14, 1928.

1,658,935

UNITED STATES PATENT OFFICE.

ROBERT A. MUNCH, OF MAYWOOD, ILLINOIS.

METALLIC PACKING RING.

Application filed May 21, 1921. Serial No. 471,411.

This invention relates to packing for rods but more particularly piston rods, valve rods and the like, and has for its primary object to provide a metallic packing which is more simple and durable in construction and efficient in operation than devices of a similar nature heretofore known.

Further objects of the invention are to provide increased flexibility in the ring and thus eliminate breakage, to facilitate the insertion of the ring in the stuffing box, to insure the proper initial positioning of the ring within the stuffing box and subsequent maintenance in this position, to provide an improved follower for the packing ring within the stuffing box, to facilitate refacing of the follower for the packing ring, to provide an improved joint between the segments of the packing ring, and in general to provide an improved rod packing.

The many other objects and advantages of the invention will be better understood by reference to the following specification when considered in connection with the accompanying drawings illustrating certain selected embodiments thereof, in which:—

Fig. 1 is a central sectional view of an assembled rod packing with the rod in place.

Fig. 2 is an enlarged end elevation of the metallic packing ring.

Fig. 3 is a side elevation partially in section of the ring shown in Fig. 2.

Fig. 4 is a section on the line 4—4 of Fig. 2.

Fig. 5 is a detail view showing the pivotal connection between parts of the ring.

Fig. 6 is an end elevation of a modified form of my packing ring.

Fig. 7 is a side elevation of the form of ring shown in Fig. 6.

Fig. 8 is an end elevation of another form of my packing ring.

Figure 9:
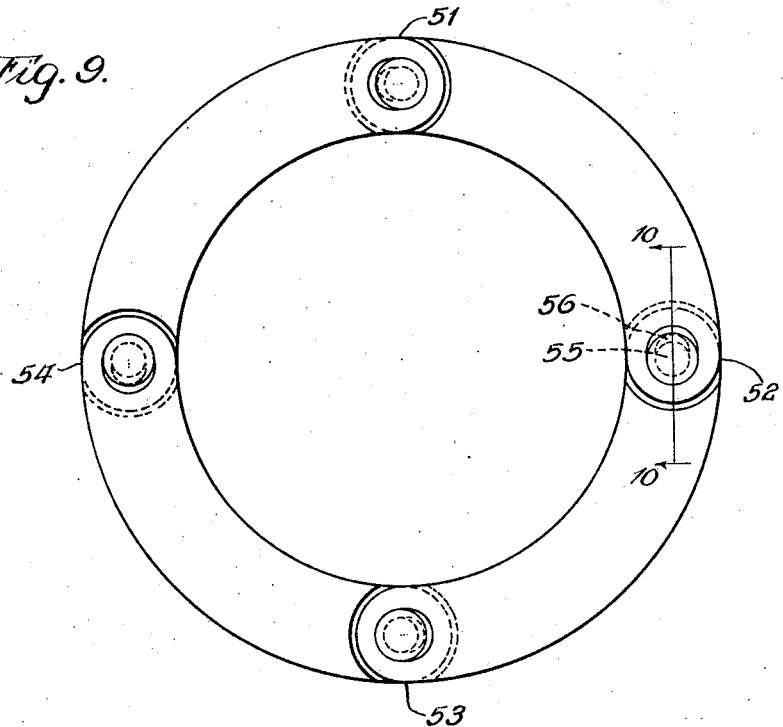
Fig. 9 is an end elevation of another modification of my invention.

Referring to the drawings, the piston rod 9 passes through the usual stuffing box 10 in the head of the cylinder. A gland 11 is secured upon the outer face of the stuffing box by bolts 12 or other suitable means and a tight joint is provided by a gasket 13. A spring 14 envelops the rod 9 and a preventer 15 surrounds this spring. An inwardly turned flange 15' on this preventer abuts the outer end coil of the spring 14 and bears against the retainer 16 closely fitting about the segmental ring or cup 17 which forms the seat for the metallic packing ring 18. A segmental ring 19, preferably of brass or other suitable material, fits about the rod 9 and abuts against the rear face of the packing ring 18. This ring 19 presents a wide face of continuous metal in contact with the packing ring and insures adequate and uniform support therefor. A sliding plate ring 21 fits upon the tapered hub 22 of the ring 19 and its front face presses against the rear face 20 on this ring. The rear face of the ring 21 projects beyond the outer end of the hub and bears against the end 23 of the gland 11. The rings 19 and 21 together form the follower for the packing ring. By thus forming the entire forward contacting face of the follower upon a single ring of one kind of metal rather than upon two separate rings generally of different metals, the wear on the follower is evenly distributed, and displacement of the packing ring produced or permitted by irregularities in the follower, cannot occur. Furthermore, the refacing of the follower is greatly facilitated in such a construction.

The spring 14, acting against the inner wall of the stuffing box, firmly presses the conical end 24 of the packing ring 18 into the corresponding conical socket 25 in the ring 17 and prevents leakage about the rod 9. A swab holder 26 is secured upon the outer end of the gland 11 and swab holder plates 27 in this holder retain the usual swabbing 28. While the ring 17 is preferably formed in segments for piston rods, I have found it advisable to use a one-piece ring for valve rods.

In the form of my improved packing ring 18 shown in detail in Figs. 2 to 5 inclusive, this ring is divided transversely into two sections 29 and 30 practically identical in form. Each of these sections is further divided into two parts 31 and 32 pivotally connected at their inner ends by a pin 33 here formed integral with the part 31. The outer end 34 of this pin is preferably headed after the parts have been assembled in order to provide a permanent connection between them. The outer ends 35 and 36 respectively of the parts 31 and 32 are preferably tapered, one with a convex end surface adapted to lie under, and the other with a concave end surface adapted to lie over the corresponding tapered ends of the other segment to form an interlocking joint between the segments. These ends are rabbeted to form closed joints at 37 between the opposing ends of the sections. Similarly the pivoted ends of the parts 30 and 31 are preferably rabbeted. The convex inner end faces 38 and 39 on the parts 31 and 32 are preferably formed substantially cylindrical with the axis of curvature coincident with the axis of the pivot pin 33 and the corresponding concave faces 40 and 41 on the opposite parts fit these faces to permit the parts to swing about this axis.

The rabbeting of the joints between the various parts of the packing ring is advantageous because the pressure exerted by the spring 14 and the steam or gases within the cylinder causes the overlapping faces to bind and effectually prevents leakage through these joints. The pivotal connection of parts of the ring facilitates the insertion of the ring in the stuffing box and its withdrawal therefrom and insures the proper positioning of the parts within the stuffing box. By thus pivotally connecting the segments, it is possible to form the ring of a number of short segments which increases the flexibility of the ring and thus eliminates the breakage which occurs in rings having long segments.

In Figs. 6 and 7 of the drawings is shown a modified form of ring 42 having three pivotal joints 43, 44 and 45 each preferably rabbeted in the manner described in connection with the previous embodiment, and a single open joint at 46 similar to the joints 37 of the previous embodiment to permit the placing of the ring upon the rod.

In Fig. 8 of the drawings is shown a further modified form of ring 47 composed of three parts or sections and the joints 48, 49 and 50 are all of the open or non-connected type. Each of these joints is preferably rabbeted in the manner described in connection with similar joints in the previous embodiments.

Figure 10:
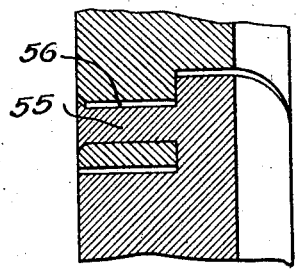
Fig. 10 is a section on the line 10—10 of Fig. 9.
Figure 11:
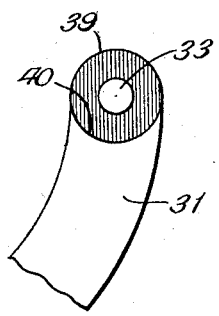
Fig. 11 is a detail rear view of one of the segments of the ring shown in Figs. 1 to 5 inclusive.

In Figs. 9 and 10 is shown a modified form of packing ring particularly suitable for use on valve rods where no open joints are necessary. In this ring all the joints 51, 52, 53 and 54 are pivotally connected in substantially the same manner as has been described in connection with similar joints in the previous embodiments. As all the joints 51 to 54 are preferably the same in form only one will be described in detail. Instead of having the pivot pin in one segment enter a cylindrical perforation in the opposing end of the next segment, this pin 55 enters a slightly elongated or arcuate slot 56 in the next segment to permit contraction of the ring as the rod becomes worn. This slot need be only slightly greater in length than the diameter of the pivot pin as the contraction of the ring will preferably be taken up uniformly by all the joints. In the previous embodiments this contraction of the ring was permitted by the open joint or joints so that no such movement in the pivotal connection was necessary.

It will be readily appreciated that the ring may be provided with any desired number of segments. Other changes may be made in the form and arrangement of parts without departing from the spirit of my invention and I reserve the right to make all such as fairly fall within the scope of the following claim.

I claim as my invention:

In a packing ring, a plurality of segments forming in assembly the body of the ring, the ends of certain of said segments being recessed to receive an extension on the end of the segment next adjacent thereto, means pivotally connecting the extension within the recess, the end of the segment having the recess being formed to be received into a pocketing cavity in the end of the segment having the extension, and said cavity having its axis perpendicular to said pivoting means thereby to prevent disalignment of the segments circumferentially of the ring and to form a tight joint at the hinge connection.

ROBERT A. MUNCH.